(12) United States Patent
Pulliam et al.

(10) Patent No.: US 6,308,977 B1
(45) Date of Patent: Oct. 30, 2001

(54) SLIDING HITCH FOR FIFTH WHEEL TRAILERS

(76) Inventors: Andrew Pulliam; Randall Pulliam, both of 13790 E. Jefferson Blvd., Mishawaka, IN (US) 46545

( * ) Notice: Subject to any disclaimer, the term of this patent is extended or adjusted under 35 U.S.C. 154(b) by 0 days.

(21) Appl. No.: 09/078,383

(22) Filed: May 13, 1998

Related U.S. Application Data

(60) Provisional application No. 60/047,872, filed on May 29, 1997.

(51) Int. Cl.[7] .................................................. B62D 53/08
(52) U.S. Cl. ............................ 280/441; 280/432; 280/901
(58) Field of Search ................................. 280/438.1, 441, 280/432, 446.1, 430, 901

(56) References Cited

U.S. PATENT DOCUMENTS

| | | | |
|---|---|---|---|
| 2,078,492 | * 4/1937 | Gurton et al. ..................... | 280/438.1 |
| 3,850,449 | * 11/1974 | Link et al. ........................... | 280/432 |
| 3,955,831 | * 5/1976 | Whitchurch ........................ | 280/446.1 |
| 5,044,651 | 9/1991 | Weikel . | |
| 5,890,728 | * 4/1999 | Zilm .................................... | 280/433 |

* cited by examiner

*Primary Examiner*—Kevin Hurley
(74) *Attorney, Agent, or Firm*—Baker & Daniels

(57) ABSTRACT

A hitch for coupling a trailer to a towing vehicle includes a first hitch member on the trailer and a second hitch member on the towing vehicle. The hitch member on the towing vehicle is mounted on a sliding mount extending across the rear axle of the vehicle. A linkage is responsive to pivoting between the trailer and towing vehicle to move the hitch on the towing vehicle toward the rear of the vehicle when turning is effected and to move the hitch on the towing vehicle just forward of the rear axle during normal longitudinal movement of the truck and trailer.

24 Claims, 13 Drawing Sheets

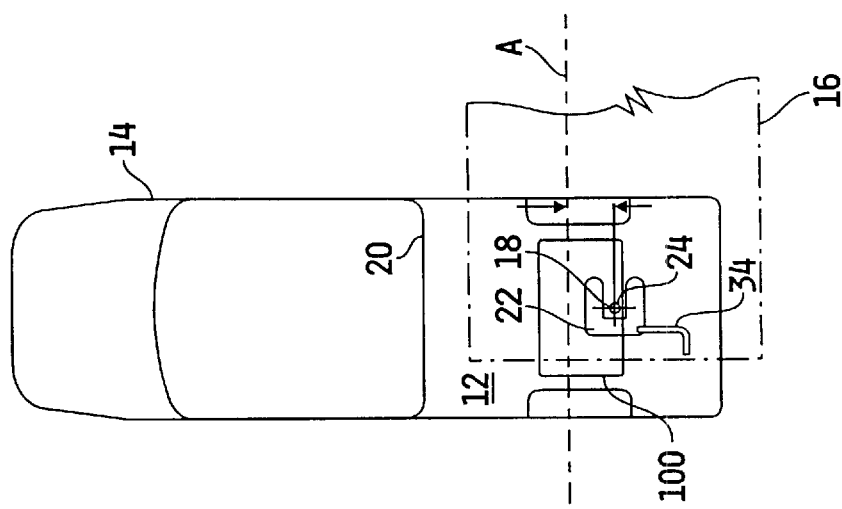
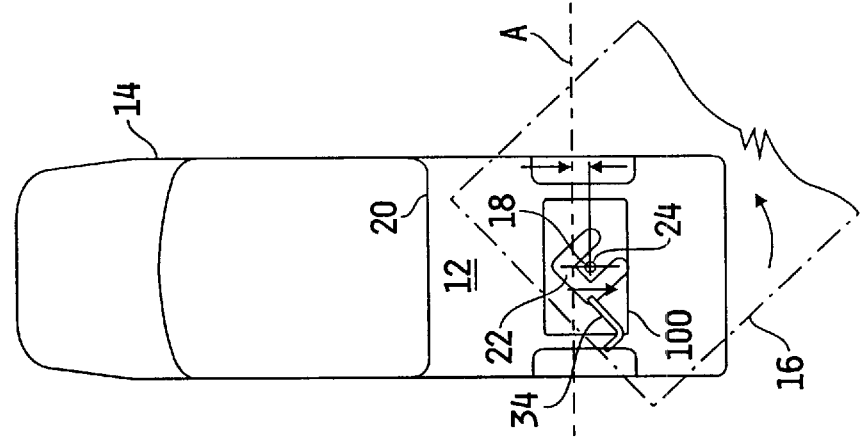
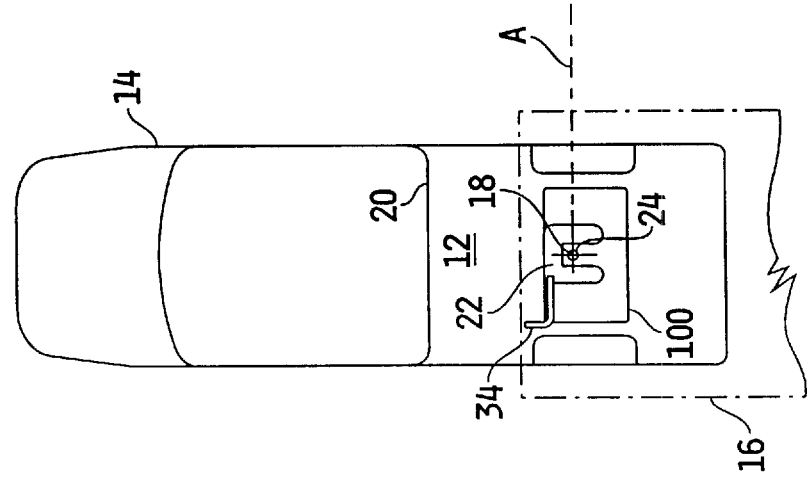

SLIDING HITCH FOR FIFTH WHEEL TRAILERS

This application claims domestic priority based upon U.S., provisional Patent Application Ser. No. 60/047,872 filed May 29, 1997.

The present invention relates generally to a self-adjusting fifth wheel hitch assembly for use on pickup trucks and similar vehicles used to tow fifth wheel trailers. The hitch assembly having the features of the present invention allows fifth wheel trailers to be towed using short bed pickup trucks and other trucks having a relatively short distance between the rear portion of the passenger compartment and the rear axle.

BACKGROUND OF THE INVENTION

Fifth wheel trailers and tow vehicles for fifth wheel trailers are generally well known in the art. Fifth wheel trailers are much longer, roomier, and heavier than typical tent campers and travel trailers, and thus a fifth wheel trailer typically requires a specially modified, relatively heavy tow vehicle such as a heavy duty pickup truck. The front portion of a fifth wheel trailer extends over the rear portion of the tow vehicle so that a portion of the trailer's weight is carried directly over the rear axle of the tow vehicle. In order to accommodate the weight of the trailer a special hitch assembly is required.

The front portion of the trailer includes a pin box which includes a support plate and a downwardly extending hitch pin. A base plate having an aperture and a latch mechanism is mounted to the tow vehicle, and the support plate carried by the pin box rests on the base plate with the hitch pin secured in the aperture by the latch mechanism. The support plate rotates relative to the base plate with the hitch pin acting as a pivot point. Typically, grease or other lubricant is applied between the support plate and the base plate. The fifth wheel trailer is thus able to pivot relative to the tow vehicle about a vertical axis to facilitate cornering and parking. Normally, the hitch assembly is mounted directly over or a short distance in front of the rear axle of the tow vehicle in order to maintain proper weight distribution.

The vehicle most commonly used to tow fifth wheel trailers is a pickup truck having an 8 foot bed length. On such a truck, there is typically at least 53 inches between the centerline of the rear axle and the rear of the cab. The maximum width for a fifth wheel trailer is 102 inches as dictated by federal highway regulations, which amounts to 51 inches on each side of the pivot point. Thus, in order to prevent contact between the trailer and the cab during cornering, there must be at least 51 inches of clearance between the pivot point and the rear of the cab (sometimes more depending on the fore/aft location of the pivot pin relative to the front of the trailer).

Recently, there has been a consumer trend towards extended cab pickup trucks, which have longer, roomier cabs. These trucks have greatly expanded interior cargo volume and also have specially designed rear jump seats for accommodating additional passengers. Unfortunately, most of these extended cab pickups are built on a standard wheelbase chassis because consumers prefer the driving characteristics of a shorter truck, and accordingly, the bed of these trucks is typically 6 feet long rather than 8 feet long. Although these shorter bed pickups have the towing capacity to handle fifth wheel trailers, they do not have enough clearance between the axle and the rear of the cab to allow the trailer to pivot to 90 degree angle without contacting the cab, which could damage the truck and severely injure any occupants. In most circumstances, a fifth wheel trailer will contact the cab of a short bed pickup at angles much less than 90 degrees.

A number of approaches have been contemplated to adapt fifth wheel trailers to short bed pickup trucks, all of which have their drawbacks. One possible approach is to use a hydraulically operated sliding base to force the hitch assembly, and hence the pivot point, rearward away from the truck cab. Such a system would be expensive, difficult to maintain and would have to be driver actuated. Hence such a system would involve a significant delay or lag time. In an accident such as a jackknife such a system would operate too slowly to prevent the trailer from contacting and most likely damaging the cab.

Another approach, which also uses a sliding base, requires the operator to exit the truck, unlock the base, lock the brakes on the trailer and pull the truck forward. This temporarily moves the pivot point rearward so that the trailer can pivot relative to the truck to a certain extent without contacting the cab. However, before resuming driving, the driver must lock the trailer brakes, back the truck towards the trailer, again exit the truck and lock the sliding hitch, and return to the truck. Obviously, such a system is impractical in many situations, such as negotiating sharp turns in traffic, and is practically useless in an emergency.

Accordingly, there exists a need for an improved sliding hitch assembly that allows fifth wheel trailers to be towed using short bed pickup trucks, but which prevents contact between the trailer and the truck during normal operations. There also exists a need for a sliding hitch assembly that slides automatically in response to pivoting movement between the trailer and the tow truck and that does not require the expense, maintenance and lag time of hydraulic systems, and does not require the operator to exit the vehicle in order to lock or unlock the hitch assembly.

SUMMARY OF THE INVENTION

The sliding hitch assembly according to the present invention allows fifth wheel trailers to be towed safely and conveniently using short bed pickup trucks. The present sliding hitch assembly automatically moves rearward away from the truck cab in response to the pivotal movement between the trailer and the truck that typically occurs during normal driving situations such as cornering, parking, etc. The hitch assembly responds almost immediately to any turns, thus substantially eliminating any lag or delay, and no operator input is needed at any time. Thus in normal operating conditions, and even in many jackknife situations, the hitch assembly slides rearward far enough so that the trailer will not contact the truck cab.

The present sliding hitch assembly includes a sliding, rotating base plate that is mounted on a pair of rods. A lever arm extends from the base plate, and a cam follower attached to the end of the lever arm engages a stationary slot that extends substantially perpendicular to the rods. Any rotation of the base plate causes the cam follower to move within the slot towards one slot ends, which in turn causes the base plate to slide back and forth along the rods. Thus, as the base plate is rotated the base plate moves between a forward position, in which the cam follower is at the center of the slot, and a rearward position, in which the cam follower is near one of the slot ends. When in the forward position, the hitch pin receiving aperture, and thus the pivot point of the trailer, is directly or slightly in front of the axle centerline. As the base plate rotates relative to the truck, the lever arm mechanism causes the base plate to slide rearwardly on the rods, effectively moving the pivot point of the trailer away from the rear of the truck cab.

In order to effectuate this sliding movement, the sliding base plate must pivot relative to the truck in tandem with the trailer, and accordingly the connection between the trailer and the truck must be modified. As in the prior art, the base plate aperture includes a latch mechanism to receive and retain the hitch pin. However, the present base plate includes a rectangular cutout or depression surrounding the base plate aperture. The standard pin box is also modified by adding a rectangular locking plate to the support plate, with the locking plate effectively being concentric with the hitch pin. When the hitch pin is positioned in the base plate aperture according to standard practice, the locking plate on the pin box registers with and locks into the cutout in the base plate. Thus, when the trailer pivots relative to the tow truck during turning, cornering, etc., the support plate carried by the pin box and the base plate locked to the support pivot along with the trailer. Consequently, the lever arm mechanism described above moves the sliding base plate and thus the pivot point back and forth relative to the truck. Thus, no matter what position the trailer is in relative to the truck, the sliding base plate prevents the trailer from contacting the cab.

Accordingly, it is an object of this invention to provide an improved fifth wheel hitch assembly that allows fifth wheel trailers to be towed using short bed pickup trucks.

It is another object of this invention to provide a sliding fifth wheel hitch assembly that prevents the fifth wheel trailer from contacting the truck cab during normal operations such as turning or cornering.

A further object of this invention is to provide a sliding fifth wheel hitch assembly that moves automatically in response to pivotal movement of the trailer relative to the tow vehicle.

A still further object of this invention is to provide a sliding fifth wheel hitch assembly that requires no driver intervention and that does not have a delay or lag time.

These and other objects of the invention will become readily apparent to those skilled in the art upon a reading of the following description.

BRIEF DESCRIPTION OF THE DRAWINGS

FIG. 5 is a fragmentary top plan view taken from above showing a fifth wheel trailer attached to a pickup truck using the sliding base plate body support assembly according to the present invention, in which the fifth wheel trailer is aligned with the pickup truck;

FIG. 6 is a top plan view similar to that shown in FIG. 5, but shown with the fifth wheel trailer turned relative to the pickup truck and illustrating the movement of the pivot point away from the rear of the cab;

FIG. 7 is a top plan view similar to that shown in FIGS. 5 and 6, in which the trailer is oriented at 90° relative to the pickup truck, and the pivot point is moved the maximum distance rearward away from the cab;

DETAILED DESCRIPTION OF THE INVENTION

Figure 1:
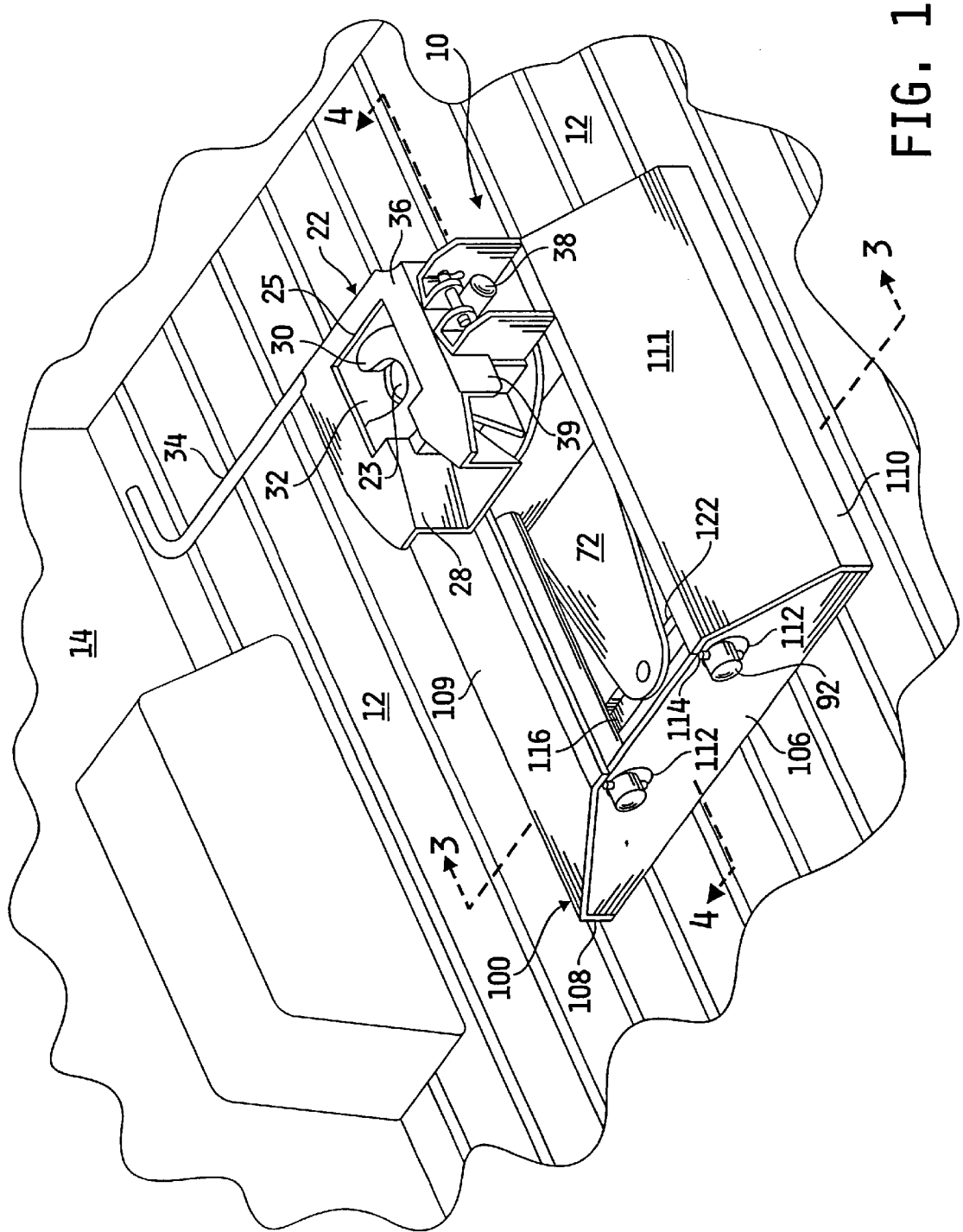
FIG. 1 is a fragmentary view in perspective of the sliding trailer hitch assembly according to the present invention shown installed in the bed of a pickup truck.

The embodiment herein described does not intend to be exhaustive or to limit the invention to the precise form disclosed. It has been chosen and described to explain the principles of the invention and its application and practical use to best enable others skilled in the art to follow its teachings.

Referring now to the drawings, a sliding fifth wheel hitch assembly according to the present invention is generally indicated by the reference numeral 10. Hitch assembly 10 is shown attached to the bed 12 of a pickup truck 14 according to common industry practice. Preferably, hitch assembly 10 is secured to the frame 13. As shown in FIGS. 5–7, hitch assembly 10 is adapted to secure a fifth wheel trailer 16 to pickup truck 14 so that trailer 16 can pivot relative to pickup truck 14 about a pivot point 18. A sliding hitch assembly 10 according to the present invention allows the pivot point 18 to slide in a rearward direction away from cab 20 and rearward from reference line "A" which is typically directly over, or in some circumstances slightly in front of, the center line of the truck axle (not shown), so that during all normal operating conditions the trailer 16 is prevented from contacting cab 20 of pickup truck 14.

Figure 2:
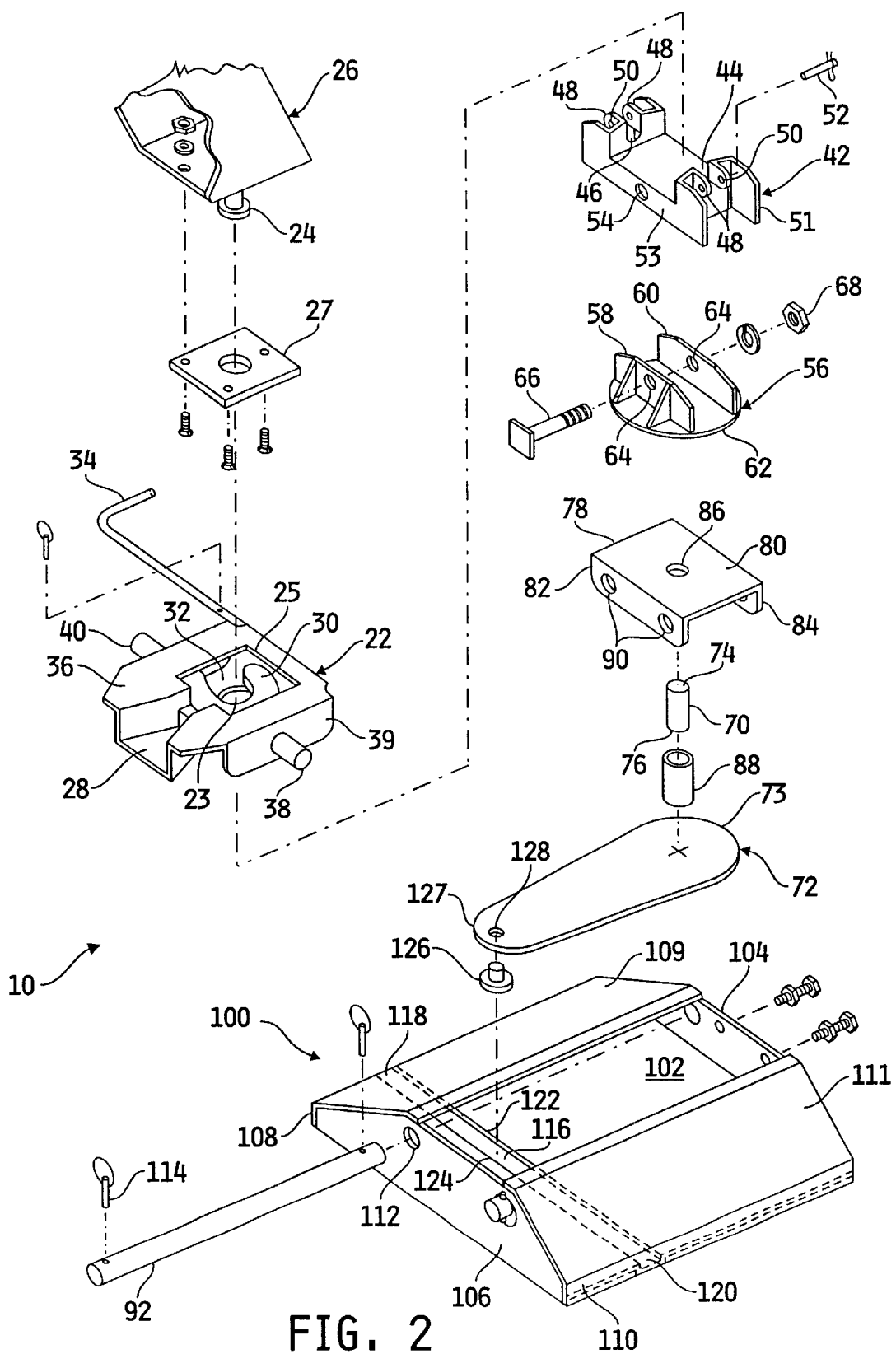
FIG. 2 is an exploded view in perspective illustrating the locking plate that secures the pin box to the base plate and also showing the lever arm assembly.
Figure 11:
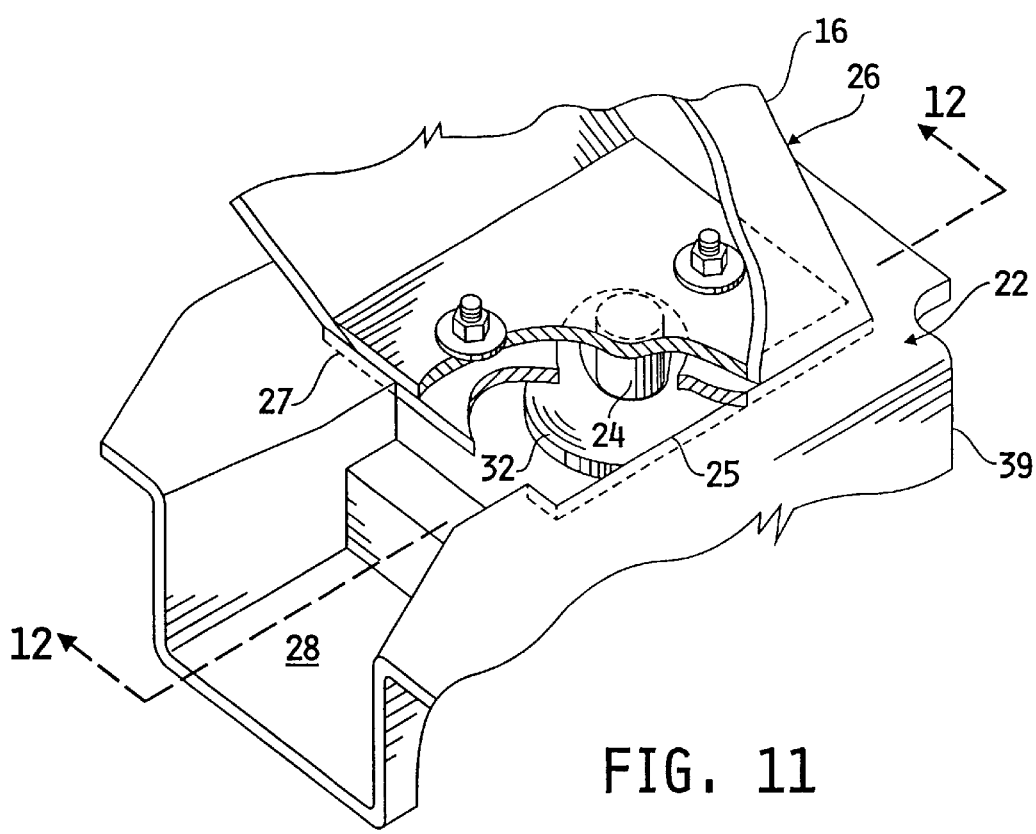
FIG. 11 is an enlarged fragmentary view in perspective of the pin box to base plate connection shown in FIGS. 3 and 4, but with portions of the pin box cut away to reveal the support plate carried by the pin box interlocking with the cutout in the base plate.
Figure 12:
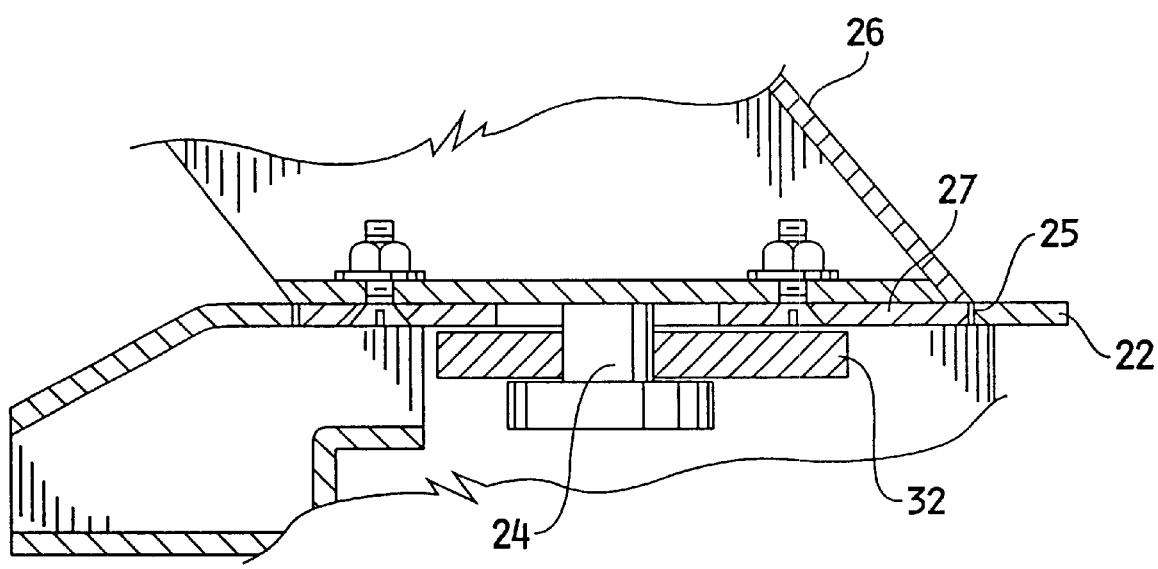
FIG. 12 is an enlarged view in section of the pin box to base plate connection shown in FIG. 11.

Referring now to FIGS. 1–4, hitch assembly 10 includes a base plate 22 having an aperture 23 therein for accommodating the hitch pin 24 which is attached to the pin box 26 of trailer 16. Hitch pin 24 corresponds with pivot point 18 as will be discussed in greater detail below. Base plate 22 includes a mounting slot 28 which is oriented towards the rear of the truck as shown in FIG. 1 and which is used to guide hitch pin 24 into aperture 23 when mounting the trailer 16 to pickup truck 14. Base plate 22 also includes a pair of internal latch members 30, 32 which are actuated by release lever 34 in a manner commonly employed in the industry in order to secure hitch pin 24 firmly to base plate 22 thus securing trailer 16 to pickup truck 14. A variety of readily available latching mechanisms as are well known in the art may be substituted for the mechanism shown. As shown in FIGS. 2, 11 and 12, base plate 22 includes a rectangular depression or cutout 25. A support plate 27 mounted to the underside of pin box 26 fits into the cutout 25, which effectively prevents relative rotation between pin box 26 and base plate 22, the purpose of which is described in greater detail below. Base plate 22 also includes a top surface 36 and a pair of pivot rods 38, 40 that extend from the sidewalls 39 which extend downwardly from top surface 36. Pivot rods 38, 40 enable base plate 22 to be pivotally mounted to first intermediate support member 42. First intermediate support member 42 includes a pair of support slots 44, 46 which accommodate pivot rods 38, 40 respectively, so that support base plate 22 can pivot relative to first intermediate support member 42 about the axis of pivot rods 38, 40 in response to angular changes between trailer 16 and pickup truck 14. Each slot 44, 46 includes a pair of retention tabs 48, and each tab 48 has a bore 50 therethrough for accommodating a cotter pin 52, which is used to secure base plate 22 to first intermediate support member 42 by locking pivot rods 38, 40 within their respective support slots 44, 46.

First intermediate support member 42 includes a front wall 51 and a rear wall 53, each of which includes a bore 54 which extends perpendicular to support slots 44, 46. First intermediate support member 42 is in turn pivotally mounted to a second intermediate support member 56. Second intermediate support member 56 includes a pair of vertical supports 58, 60 mounted to a base member 62. Vertical supports 58, 60 each include a bore 64 therethrough for accommodating a threaded pivot bolt 66. First intermediate support member 42 is received in the gap between plates supports 58 and 60, and support member 42 is secured to second intermediate support member 56 by pivot bolt 66. Pivot bolt 66 extends through 54 and 64 so that first intermediate support 42 is pivotable relative to second intermediate support 56 about the axis of bolt 66. Bolt 66 is secured within bores 54, 64 by threaded nut 68. Accordingly, hitch pin 24 and hence trailer 16 is rotatable about mutually orthogonal axes in response to angular changes between trailer 16 and pickup truck 14.

Figure 4:
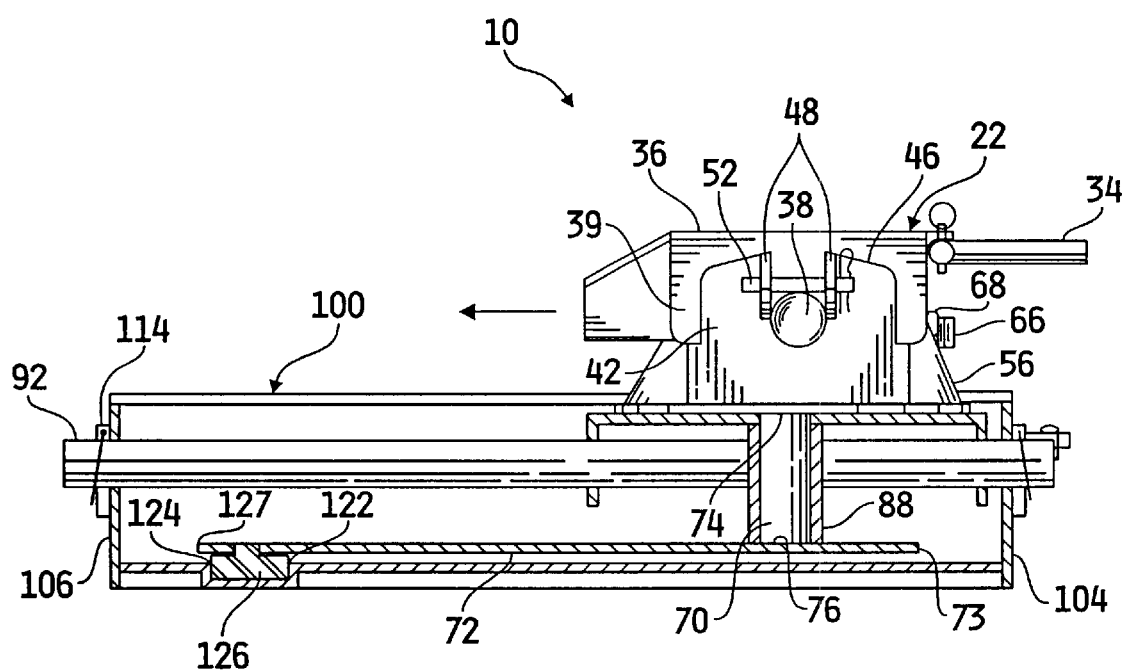
FIG. 4 is an elevational view in section taken substantially along line 4—4 of FIG. 1 showing the sliding support assembly, the support rods and the lever arm.
Figure 8:
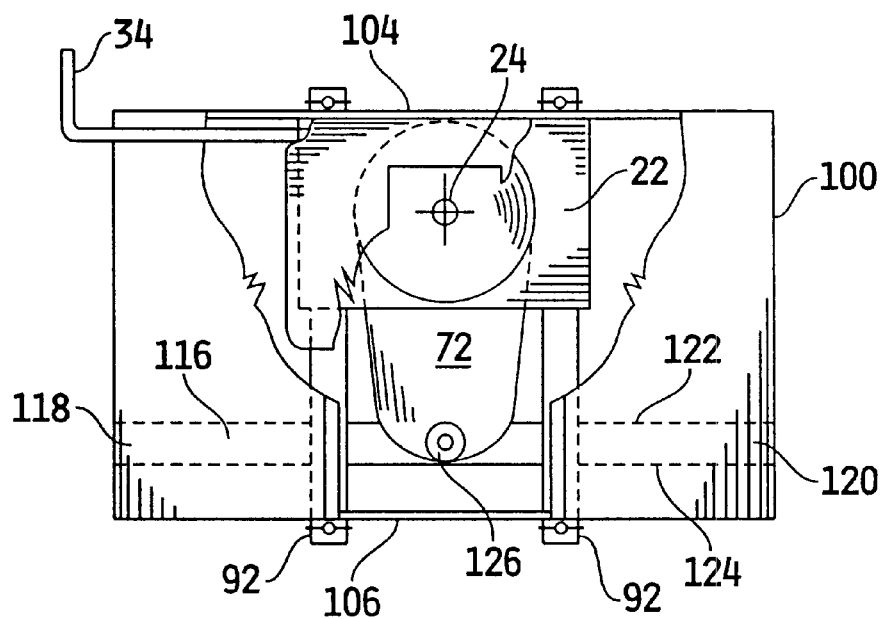
FIG. 8 is a fragmentary top plan view of the hitch assembly as it would be situated with the trailer in the position of FIG. 5.

As shown in FIGS. 2 and 4, a pivot pin 70 connects second intermediate support 56 to a lever arm 72 which is slidably mounted within guide box 100 as discussed in greater detail below. The top end 74 of pivot pin 70 is welded or otherwise secured to the bottom face of base member 62, while the bottom end 76 of pivot pin 70 is welded or otherwise secured to the pivot end 73 of lever arm 72. Accordingly, any rotation of base member 56 produces a corresponding rotation in lever arm 72. Slide plate 78 fits between lever arm 72 and second intermediate support 56. Slide plate 78 includes a top surface 80 and a pair of downwardly depending endwalls 82, 84. Top surface 80 includes a hole 86, which is sized to accommodate pivot pin 70 and bushing 88 which is provided to prevent binding between pivot pin 70 and slide plate 78. Sidewalls 82, 84 each include a pair of guide bores 90 which engage guide rods 92 to guide slide plate 78 back and forth as is discussed in greater detail below.

Figure 3:
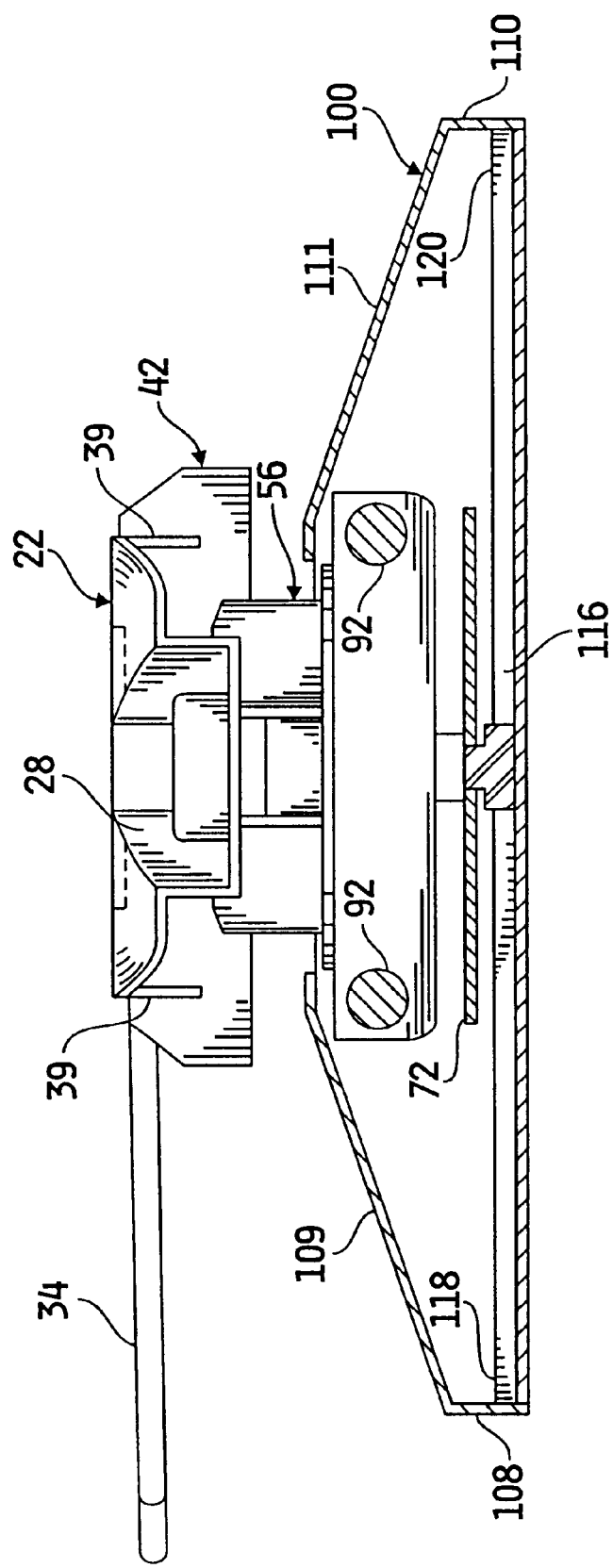
FIG. 3 is an elevational view in section taken substantially along line 3—3 of FIG. 1.

As shown in FIGS. 2, 3 and 4, the entire structure consisting of base plate 22, first and second intermediate supports 42 and 56, slide plate 78 and lever arm 72 are supported by guide box 100. Guide box 100 is bolted, welded or otherwise secured to frame 13 of pickup truck 14 by drilling holes (not shown 0 through bed 12. Guide box 100 includes a bottom surface 102, front and rear walls 104, 106, and left and right side walls 108, 110, having sloped portions 109, 111, respectively. Front and rear walls 104, 106 each include a pair of holes 112 which support guide rods 92, so that guide rods 92 extend through the interior of guide box 100. A shear pin 114 at each end of guide rods 92 maintain rods 92 in guide box 100, and enable rods 92 to be removed during assembly or disassembly or during servicing of hitch assembly 10. Bottom surface 102 of box 100 includes a transverse slot 116 which extends generally perpendicular to guide rods 92. Slot 116 includes a left and right ends 118, 120, and further includes a front edge 122 and a rear edge 124. Lever arm 72 includes a cam roller 126 attached to cam end 127 of lever arm 72 through mounting bore 128. Cam roller 126 engages slot 116 and cams against the edges 122, 124 of slot 116 upon pivotal movement of lever arm 72, which occurs upon rotation of pin box 26 and base plate 22, thus causing slide plate 78 to slide back and forth along guide rods 92. Accordingly, slide plate 78 is shiftable between a forward position in which plate 78 is disposed adjacent front wall 104, and a rearward position in which plate 78 is disposed adjacent rear wall 106 of guide box 100. When in the rearward position, cam roller 126 may be disposed adjacent either end 118 or 120 of slot 116 depending on the direction of rotation of lever arm 72, which is dictated by the direction of rotation of trailer 16 relative to truck 14. A pair of adjustment bolts 130 mounted through front wall 104 abut slide plate 78 when the plate is in the forward position. When slide plate 78 is in the forward position adjustment bolts 130 prevent inadvertent fore/aft movement of slide plate 78.

Figure 9:
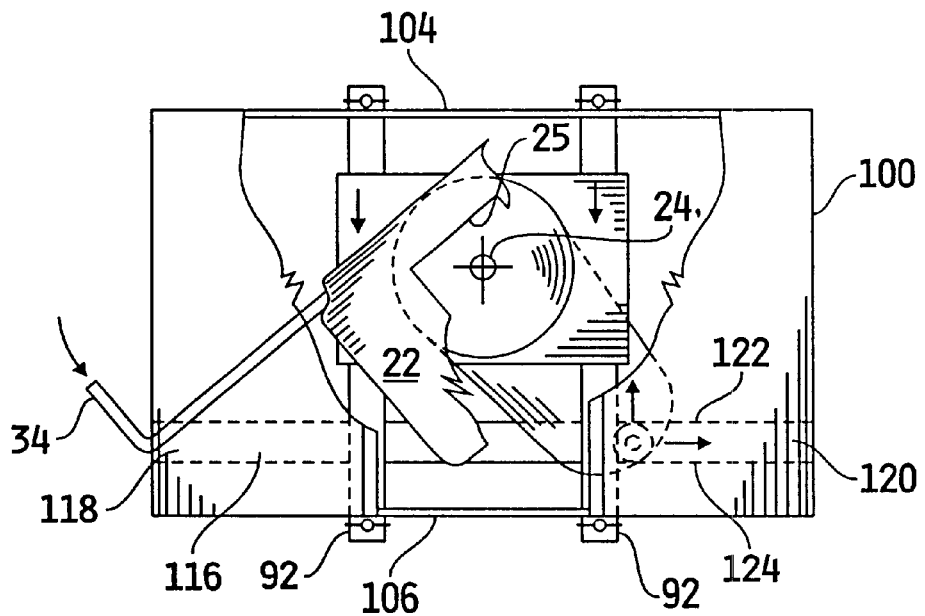
FIG. 9 is a fragmentary top plan view similar to that shown in FIG. 8 but illustrating the configuration of the hitch assembly when the trailer is in the position of FIG. 6.
Figure 10:
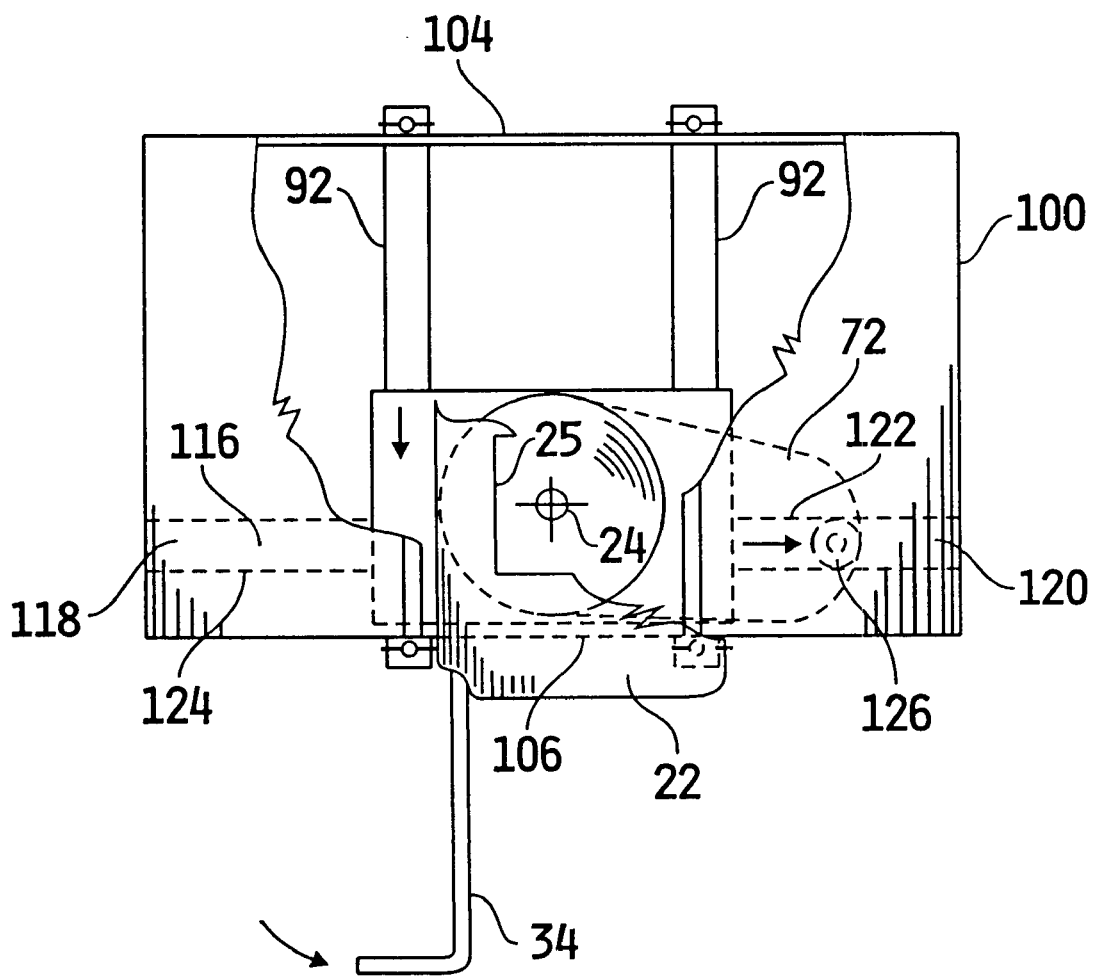
FIG. 10 is a top plan view similar to FIGS. 8 and 9, but showing the configuration of the hitch assembly when the trailer is in the position shown in FIG. 7.

In operation, with latch members 30 and 32 in an open position, a trailer 16 is mounted to pickup truck 14 according to standard practice by backing the pickup truck towards the trailer until the hitch pin 24 slides though slot 28 and into aperture 23. In the process, support plate 27 slides into cutout 25 in base plate 22. Upon actuation of lever 34, latch members 30, 32 close about hitch pin 24, thus securing hitch pin 24 in aperture 23 and also securing pin box 26 to base plate 22. At this point any relative rotation between pin box 26 and base plate 22 is prevented. The trailer 16 may then be towed in the normal manner by pickup truck 14. When pickup truck 14 and trailer 16 encounter a turn in the road, trailer 16 pivots relative to pickup 14 and guide box 100 about a vertical axis which coincides with hitch pin 24 and pivot point 18. When the trailer 16 turns relative to the truck 14 as shown in FIGS. 6 or 7, base plate 22, first and second intermediate supports 46 and 56, and lever arm 72 also turn relative to pickup truck 14. As shown in FIG. 9, rotation of trailer 16 relative to guide box 100, which is fixed in the bed 12 of pickup 14, causes cam end 127 of lever 72 to slide towards one of ends 118, 120 of slot 116. In the process, cam 126 presses against edge 122 of slot 116 causing a moment which draws slide plate 78 away from front wall 104 along guide rods 92. In the process, the hitch pin 24 carried by base plate 22 move in a rearward direction away from the cab 20 of pickup 14, thereby providing enough room for trailer 16 to pivot without contacting cab 20 of pickup truck 14. When the truck/trailer combination straightens out and returns from the turned position shown in FIG. 6 or 7 to the straight position of FIG. 5, cam 126 presses against edge 124 of slot 116, again creating a moment that urges slide plate 78 in a forward direction guided by rods 92 back towards front wall 104.

Figure 13:
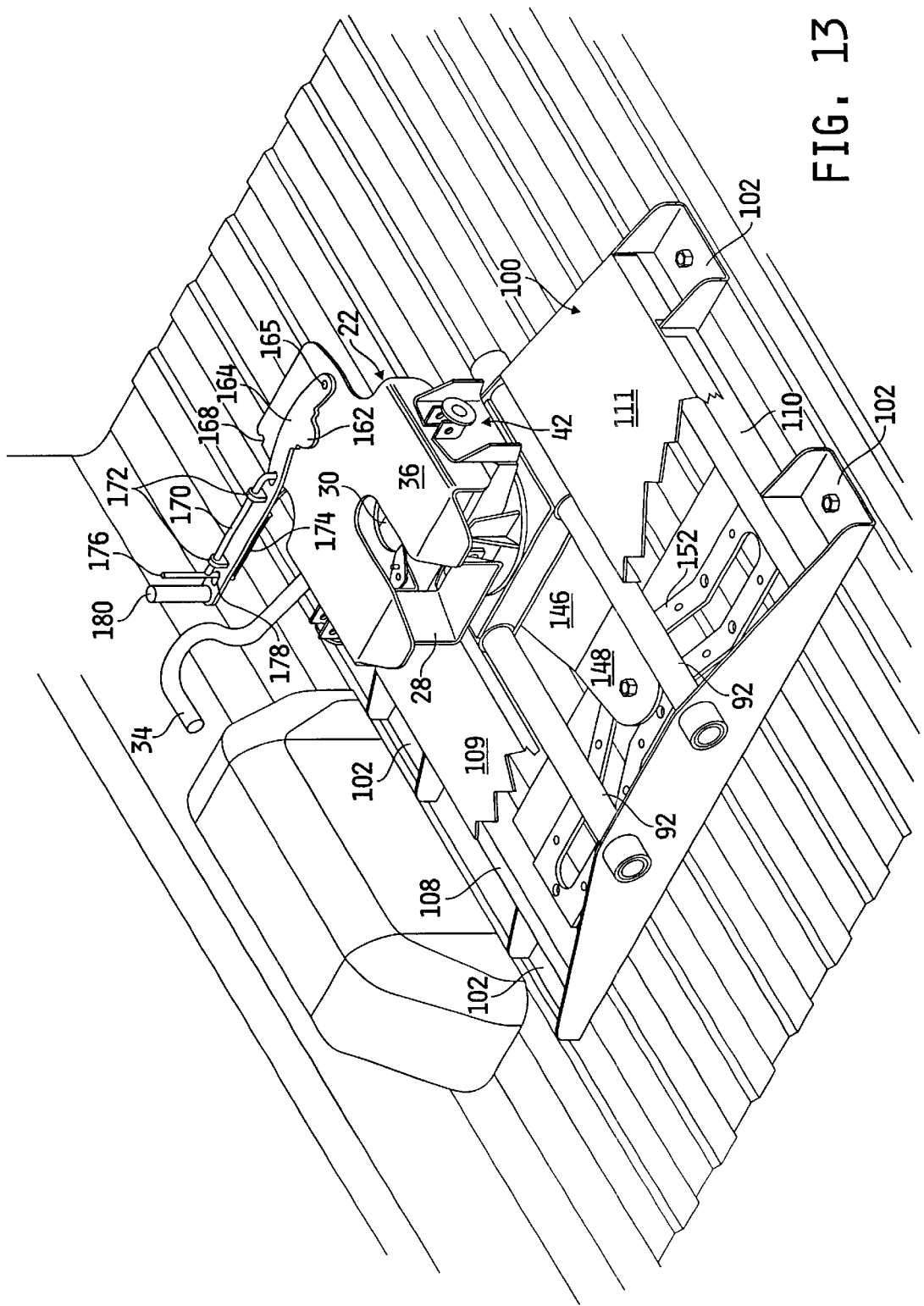
FIG. 13 is a fragmentary view in perspective of a sliding trailer hitch according to a second embodiment of the present invention, illustrated installed in the bed of a pickup truck.
Figure 14:
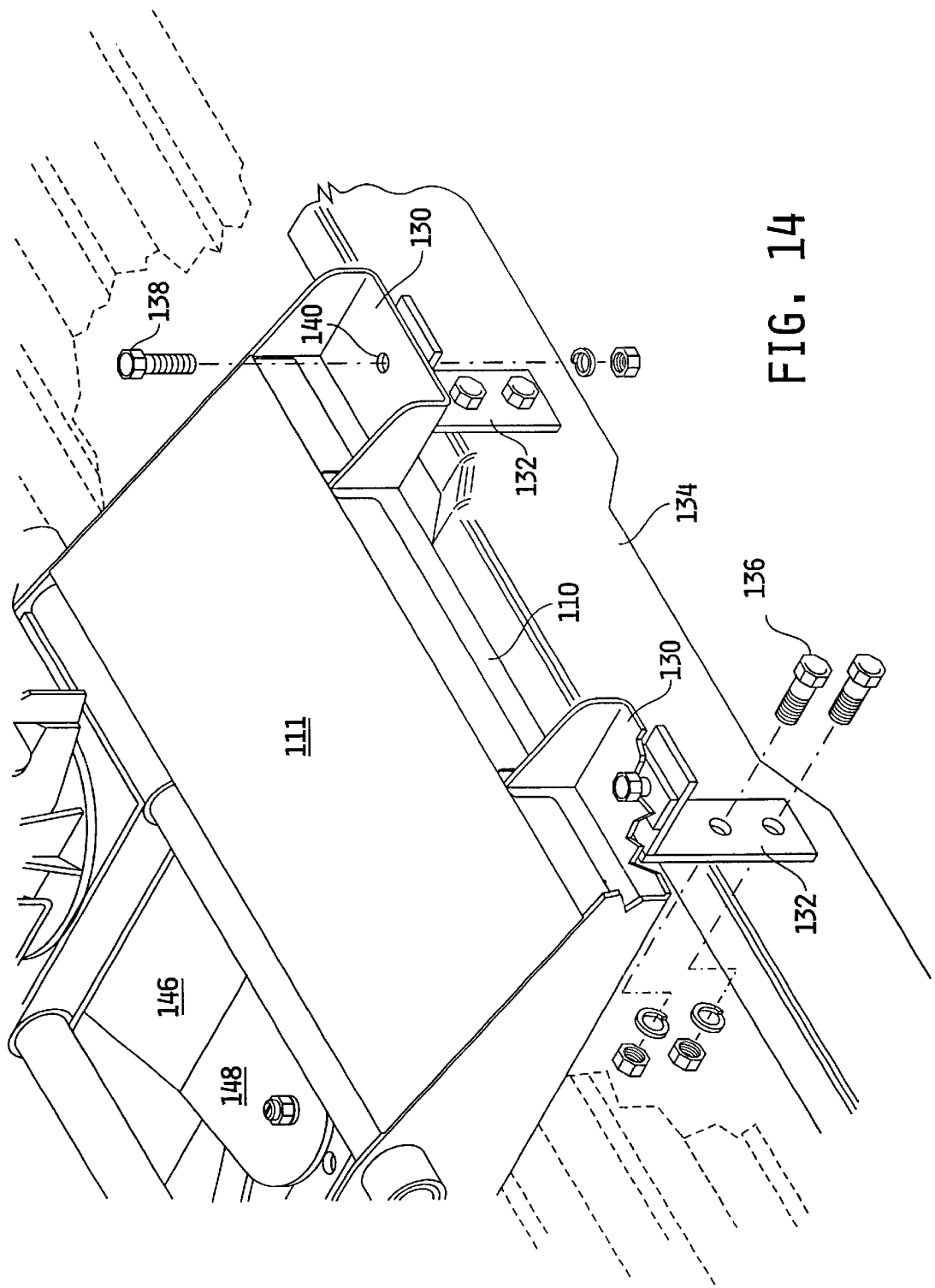
FIG. 14 is a detailed view of a portion of the hitch illustrated in FIG. 13, shown with the floor of the bed of the pickup truck broken away to illustrate the manner in which the hitch is secured to the truck.
Figure 15:
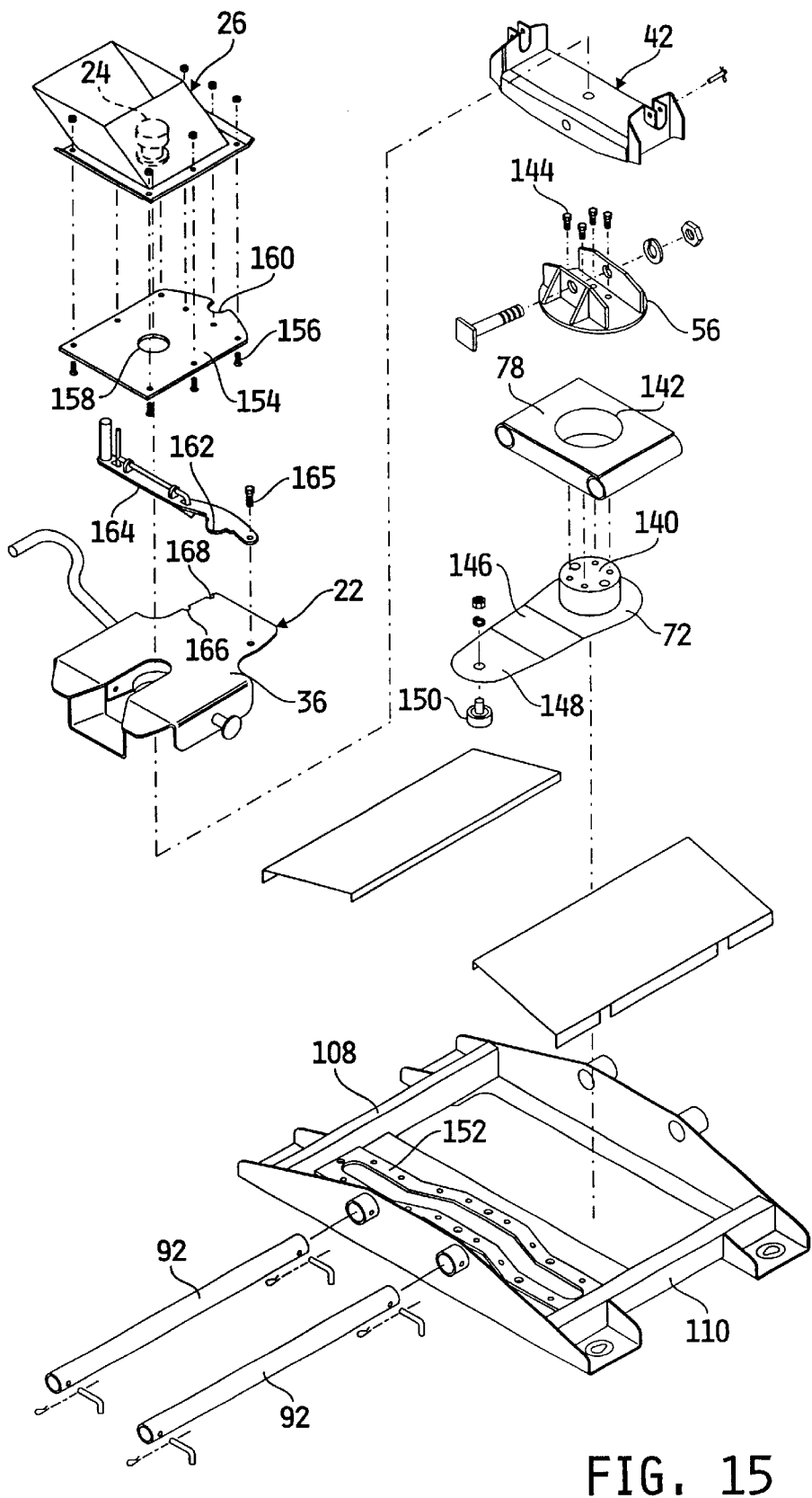
FIG. 15 is an exploded view in perspective of the sliding trailer hitch illustrated in FIGS. 13 and 14.
Figure 16:
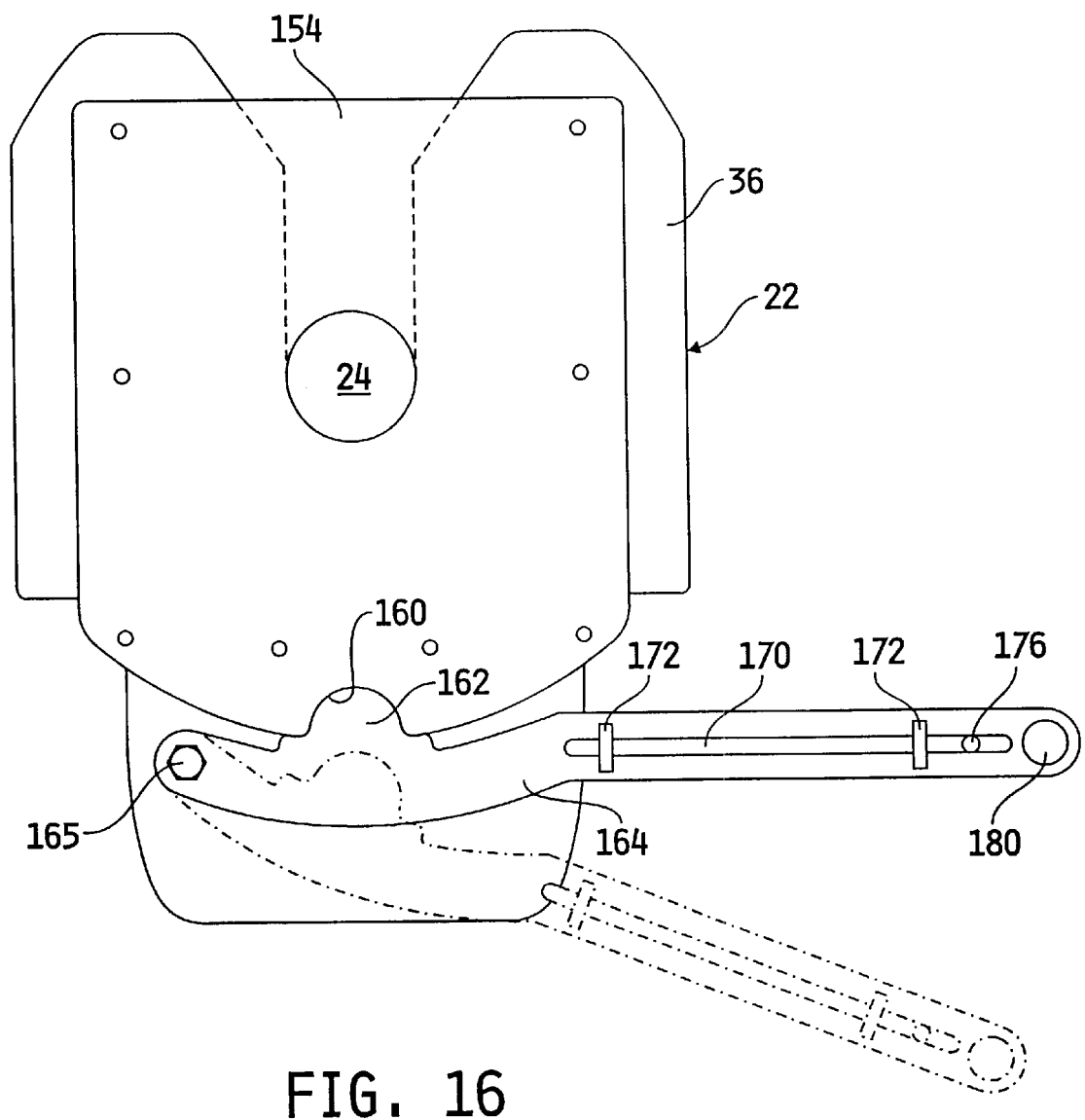
FIG. 16 is a top plan view of a portion of the hitch illustrated in FIGS. 13, 15, and illustrating the manner in which the hitch members on the pickup truck and on the trailer are coupled together.

Referring now to the alternate embodiment of FIGS. 13–16, elements the same or substantially the same as in the embodiments of FIGS. 1–12 retain the same reference character. Referring to FIGS. 13 and 14, the guide box 100 is secured to the bed of a pickup truck through ears 130 that extend from side walls 108, 110 of the guide box 100. Conventional angle brackets 132 are secured to side frame members 134 of the pickup truck that supports the bed 12 thereof. Conventionally, a pair of side frame members 134 extend substantially parallel to each other and support the truck bed 10 and are a part of the overall vehicle frame. As illustrated in FIG. 14, two angle brackets are secured to each of the side frame members 134 and are attached thereto by conventional fasteners 136. Conventional fasteners 138 extend through apertures 140 on the ears 130 to secure the ears 130 to the brackets 132. Clearly, if it is desired to remove the hitch 10 from the bed of the pickup truck, the fasteners 138 are removed and the hitch 10 can then easily be removed, leaving the substantially flat bed.

The pivot pin 70 in sleeve 88 illustrated in FIG. 2 is replaced in the embodiment of FIGS. 13–16 with an enlarged cylindrical boss 140 on the lever 72. The boss 140 extends through a correspondingly sized aperture 142 in the slide plate 78 and is connected to second support member 56 by conventional fasteners 144. The lever 72 includes a step-down portion 146 and an end portion 148 upon which cam roller 150 is rotatably mounted. The cam roller 150 engages and is guided by a track 152 which extends between the side walls 108, 110. The track guides the cam roller 150 as the second support member 56 is rotated by pivoting of the trailer with respect to the pickup truck to thereby move the slide plate 178 along the rods 92 in the same way as in the embodiment of FIGS. 1–12.

A modified support plate 154 is secured by conventional fasteners 156 to the bottom of pin box 26 which carries the king pin 24. The hitch pin 24 extends through aperture 158 in support plate 154 and through mounting slot 28 and aperture 23 when the trailer is coupled to the truck. The support plate 158 includes a cutout notch 160 which is adapted to receive a projection 162 on a lever 164 when the trailer is coupled to the truck and the hitch pin 24 is received in aperture 23. When this occurs, the support plate 154 is engaged with the top surface 36 of base plate 22. The lever 164 is pivotally mounted on the base plate 22 by a pivot connection 165.

The base plate 22 is provided with notches 166, 168. The handle 164 is provided with a rod 170 slideably mounted for movement within ears 172 extending from the lever 164 and is spring loaded toward the pivot 165 by a spring 174. A lever 176 extends through elongated aperture 178 in lever 164. Accordingly, the member 170 is urged into latching engagement with one of the slots 166, 168 when the lever 164 is brought into either of the latching positions illustrated in solid and dotted lines in FIG. 16. The member 170 may be withdrawn from its notch for movement toward the other notch by moving the member 176 toward handle 180 on lever 164. When in the latched position with the member 170 engaged with the notch 166 and with the hitch pin 24 coupled in the aperture 23, the projection 162 engages the notched recess 160 in support plate 154 to thereby prevent relative rotation between the hitch box 26 and the base plate 22. However, when the lever 164 is moved to the dotted line position in FIG. 16 and with the member 170 engaged with the notch 168, the projection 162 is moved out of the notched recess 160, thereby permitting relative movement between the hitch box 26 and the base plate 22, such as upon coupling and uncoupling the trailer.

It will be appreciated that the foregoing is presented by way of illustration only, and not by way of any limitation, and that various alternatives and modifications may be made to the illustrated embodiment without departing from the spirit and scope of the invention.

What is claimed:

1. A hitch for coupling a trailer to a towing vehicle comprising a first hitch member on the trailer and a second hitch member on the towing vehicle for securing said trailer to the towing vehicle, said trailer pivoting with respect to the towing vehicle to effect turning, a sliding mount slidably mounting said second hitch member for sliding movement longitudinally with respect to the towing vehicle, and a linkage responsive to pivoting of the trailer with respect to the towing vehicle to move said second hitch member on said sliding mount as the trailer pivots with respect to the towing vehicle wherein said linkage is between said first hitch member and said sliding mount.

2. Hitch as claimed in claim 1, wherein said linkage includes a pivotal connection permitting said second hitch member to pivot with respect to the towing vehicle.

3. Hitch as claimed in claim 2, wherein a latching mechanism locks said first and second hitch members against pivoting relative to one another.

4. Hitch as claimed in claim 2, wherein said sliding mount includes a frame mounted on the towing vehicle, a rod mounted longitudinally on said frame and extending longitudinally with respect to the towing vehicle, and a slide plate slidable on said rod, said linkage including a member pivoting with respect to the slide plate.

5. Hitch as claimed in claim 4, wherein said member includes a pivot pin, said linkage including a lever arm having an end rigidly connected to said pivot pin whereby movement of said one end of the arm about an opposite end of the arm slides said slide plate along said rod.

6. Hitch as claimed in claim 5, wherein said opposite end of the lever arm includes a follower engaging a track mounted on said support to guide said opposite end in movement relative to said support in response to rotation of the lever arm by rotation of the pivot pin.

7. Hitch as claimed in claim 6, wherein said second hitch member is fixed to said pivot pin against rotation relative thereto whereby rotation of the second hitch member due to pivoting of the trailer with respect to the towing vehicle when turning is effected rotates said lever to move said slide plate along said rail.

8. Hitch as claimed in claim 7, wherein said second hitch member is mounted on said pivot pin via hinged connections permitting pivoting of the second hitch member about mutually orthogonal horizontal axes.

9. Hitch as claimed in claim 8, wherein a latching mechanism locks said first and second hitch members against pivoting relative to one another.

10. Hitch as claimed in claim 2, wherein said linkage includes a pivot pin secured to said second hitch member against rotation relative thereto whereby rotation of the second hitch member due to pivoting of the trailer with respect to the towing vehicle when turning is effected rotates said pivot pin to operate said linkage.

11. Hitch as claimed in claim 10, wherein said second hitch member is mounted on said pivot pin via hinged connections permitting pivoting of the second hitch member about mutually orthogonal horizontal axes.

12. A hitch for coupling a trailer to a towing vehicle, said towing vehicle having a driver's position and a rear axle behind the driver's position, said hitch comprising a first hitch member on the trailer and a second hitch member on the towing vehicle coupling with said first hitch member at a hitch point from a first position during normal forward longitudinal movement of the trailer and towing vehicle, and displacing means responsive to pivoting of the trailer with respect to the towing vehicle for moving said second hitch member and said hitch point rearwardly away from the driver's position toward a second position in response to pivoting of the trailer with respect to the towing vehicle.

13. Hitch as claimed in claim 12, wherein said displacing means includes a sliding mount on the towing vehicle slidably mounting said second hitch member for movement relative to the towing vehicle and a linkage responsive to pivoting of the trailer with respect to the towing vehicle to move said second hitch member along said sliding mount.

14. Hitch as claimed in claim 13, wherein said sliding mount extends across the rear axle of the towing vehicle, said first position being between the operator's position and the rear axle, said second position being behind the rear axle.

15. Hitch as claimed in claim 13, wherein said sliding mount includes a frame mounted on the towing vehicle, a rod mounted longitudinally on said frame and extending longitudinally with respect to the towing vehicle, and a slide plate slidable on said rod, said linkage including a member pivoting with respect to the slide plate, said rod extending across the rear axle of the towing vehicle, said first position being between the operator's position and the rear axle, said second position being behind the rear axle.

16. Hitch as claimed in claim 15, wherein said linkage includes a lever arm having an end rigidly connected to said pivot pin whereby movement of said one end of the arm about an opposite end of the arm slides said slide plate along said rod, said opposite end of the lever arm includes a follower engaging a track mounted on said support to guide said opposite end in movement relative to said support in response to rotation of the lever arm by rotation of a pivot pin.

17. A hitch for coupling a trailer to a towing vehicle comprising a first hitch member on the trailer and a second hitch member on the towing vehicle for securing said trailer to the towing vehicle, said trailer pivoting with respect to the towing vehicle to effect turning, a sliding mount slidably mounting said second hitch member for sliding movement longitudinally with respect to the towing vehicle in response to pivoting between the trailer and the towing vehicle, and a latching mechanism locking said first and second hitch members against pivoting relative to one another.

18. Hitch as claimed in claim 17, wherein said latching mechanism is a plate carried by one of said hitch members engaging a receptacle in the other hitch member when the hitch members are coupled together.

19. Hitch as claimed in claim 17, wherein said latching member includes a lever pivotally mounted on one of said hitch members having a portion engaging a recess in the other hitch member.

20. A hitch for coupling a trailer to a towing vehicle comprising a first hitch member on the trailer and a second hitch member on the towing vehicle for bearing the weight of the trailer and being an anchor point for securing said trailer to the towing vehicle, said trailer pivoting with respect to the towing vehicle to effect turning, a sliding mount slidably mounting said second hitch member for sliding movement longitudinally with respect to the towing vehicle, and a linkage responsive to pivoting of the trailer with respect to the towing vehicle to move said second hitch member on said sliding mount as the trailer pivots with respect to the towing vehicle, wherein said linkage is between said first hitch member and said sliding mount.

21. The hitch of claim 20 wherein said linkage includes a pivotal connection permitting said second hitch member to pivot with respect to the towing vehicle.

22. The hitch of claim 21, wherein a latching mechanism locks said first and second hitch members against pivoting relative to one another.

23. A hitch for coupling a trailer to a towing vehicle comprising a first hitch member on the trailer and a second hitch member on the towing vehicle for bearing the weight of the trailer and being an anchor point for securing said trailer to the towing vehicle, said trailer pivoting with respect to the towing vehicle to effect turning, a sliding mount slidably mounting said second hitch member for sliding movement longitudinally with respect to the towing vehicle, and a linkage responsive to pivoting of the trailer with respect to the towing vehicle to move said second hitch member on said sliding mount as the trailer pivots with respect to the towing vehicle, wherein said sliding mount includes a frame mounted on the towing vehicle, a rod mounted longitudinally on said frame and extending longitudinally with respect to the towing vehicle, and a slide plate slidable on said rod, said linkage including a member pivoting with respect to the slide plate.

24. The hitch of claim 23, wherein said second hitch member includes a pivot pin, said linkage including a lever arm having an end rigidly connected to said pivot pin whereby movement of said one end of the arm about an opposite end of the arm slides said slide plate along said rod.

* * * * *